UNITED STATES PATENT OFFICE.

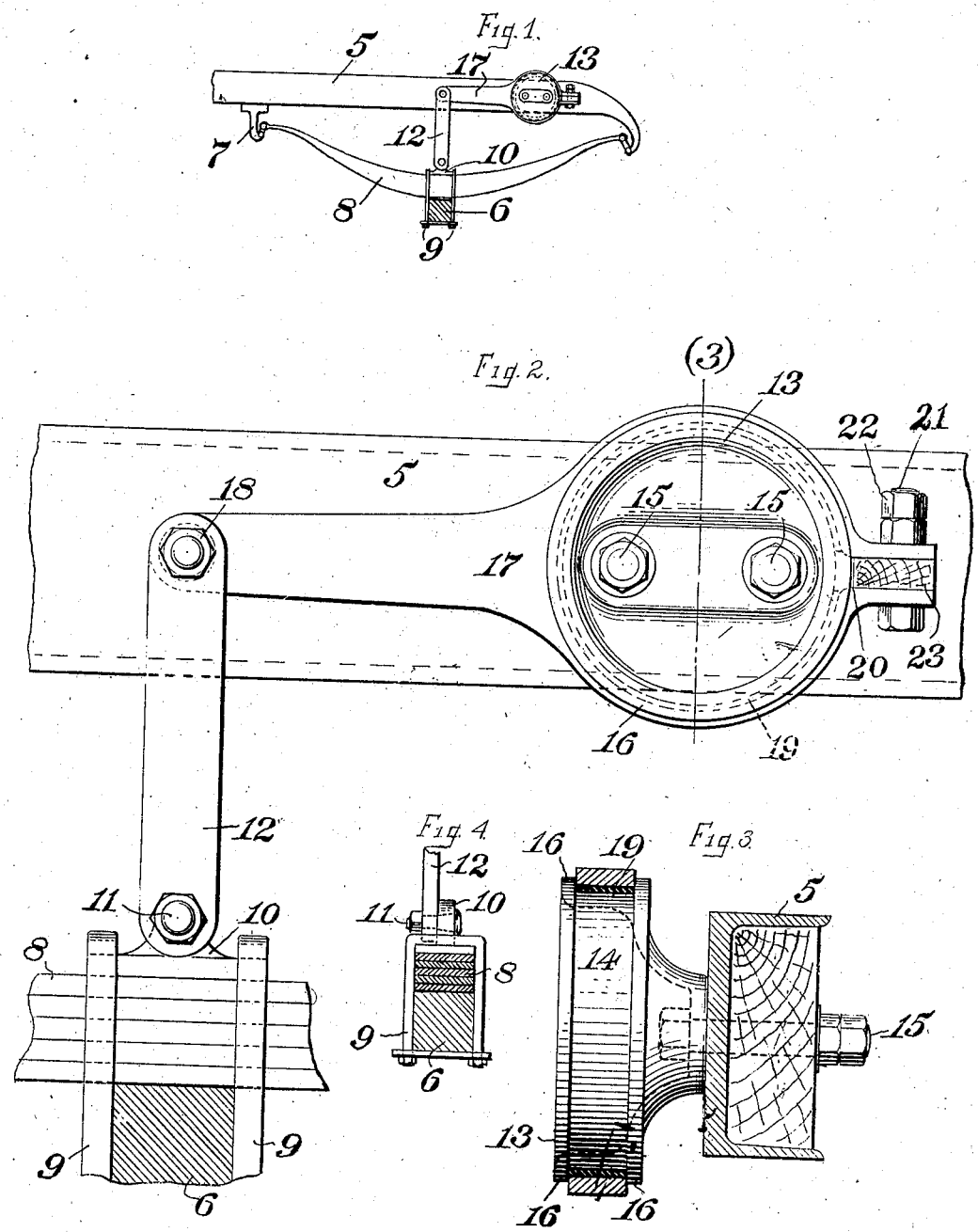

OSCAR E. VESTAL, OF PITTSBURG, PENNSYLVANIA.

SHOCK-ABSORBER.

No. 823,829.     Specification of Letters Patent.     Patented June 19, 1906.

Application filed August 24, 1905. Serial No. 275,528.

*To all whom it may concern:*

Be it known that I, OSCAR E. VESTAL, a citizen of the United States, residing at Pittsburg, in the county of Allegheny and State of Pennsylvania, have invented a certain new and useful Shock-Absorber, of which the following is a specification.

My invention has reference to a device for absorbing the shock of vehicle springs, and is especially adapted for use in automobile service where the high speeds attained produce shocks to the springs and to the gear, of very severe character, over rough pavements. The primary object of this improvement is to produce a device of the character specified, which will be efficient in its action, reliable at all times, and which can be constructed at a low cost, and the resistance or friction whereof can be readily adjusted and the wearing parts whereof can be renewed with a minimum of trouble.

The above, as well as such objects as may hereinafter appear, I attain by means of a construction which is illustrated in preferred form in the accompanying drawings, wherein—

Figure 1 is a side elevation showing an automobile spring attached at one end of the frame of the vehicle, having my improvement applied thereto;

Figure 2 is an enlarged view showing more of the details of construction;

Figure 3 is a sectional view taken on the line (3) of Figure 2, and

Figure 4 is a detailed view showing the attaching device by which the mechanism is secured to the spring.

Referring now more particularly to Figure 1, it will be seen that I have indicated at 5 the rear end of an automobile frame of usual construction, the axle of the vehicle being shown at 6, and the spring hanger at the forward end of the spring at 7, the spring itself being marked 8, and being secured to the axle by the usual form of U-bolts or clips indicated at 9. Above the spring, and also secured preferably by means of the U-bolts 9, I have constructed a special form of cross-bar 10, provided with an outwardly projecting pin 11 adapted to enter the connecting link 12 that serves to impart the movement of the axle and center of the spring to my shock absorbing device secured upon the frame 5.

The shock absorbing device proper consists of the member 13 which is preferably formed of a drum of cylindrical shape, having the friction surface 14, and hollowed out inside in a shape adapted to receive preferably the two attaching bolts 15 that form the means of securing the drum 13 to the frame 5. The friction surface 14 has at each side thereof the upstanding flanges 16, and between such upstanding flanges and engaging such friction surface is the rocking member 17 which is secured at one end as indicated at 18 to the link 12, and at the other is formed to go around and embrace the cylinder or drum as shown, being provided on its inner face with a leather lining 19, and slitted at 20, so as to allow the use of a bolt 21 with the lock nut 22 for adjusting the tension of the band around the drum. Between the forked ends or extensions of the band, as indicated in Figure 2, I may use, if desired, a wooden block 23, the thickness whereof may be changed, if desired, or which can be compressed by further movement of the adjusting bolt 21 or the nut thereof.

It is obvious that with the construction described, after the frictional lining of the rocking part 17 has become worn so as to require renewal the bolt 21 may be taken out and the band sprung open to allow it to be taken off the drum and the new lining inserted. I have described the frictional material employed, as leather, but other equivalent substances may be used if preferred.

The operation of my improvement is as follows: When the vehicle strikes an obstruction which tends to move the axle upward, the link 12 transmits the upward force to the end of the arm or projection on the oscillating part 17, rotating the band around the drum with frictional resistance, which movement tends to retard the upward throw of the spring and also the recoil thereof which immediately follows, and which latter is the more troublesome element in action of this kind, and the one most likely to break the springs. It will be observed that the mechanism is readily attached to any vehicle of this character, and comprises but few parts and is not liable to get out of order, and has a frictional resistance which is practically constant and easily adjustable.

Having thus described my invention and illustrated its use, what I claim as new, and desire to secure by Letters Patent, is the following:

1. In combination, a vehicle body, a vehicle spring, a friction drum secured to the vehicle body, a split friction band thereon having an operating arm intermediate the ends of the split band, means for securing the ends of the split band rigidly and adjustably in position, and a connecting arm pivotally secured to the band arm at one end and to the springs at the other.

2. In combination, a drum provided with attaching means, a split friction band provided with securing lugs and an arm, an interposed yielding block between the lugs, means for adjusting the relative position of the lugs, and means for securing the arm to a spring.

3. In combination, a drum provided with attaching means, a split friction band provided with securing lugs and an arm, yielding means between the lugs, means for adjusting the relative position of the lugs, and means for securing the arm to a spring.

In testimony whereof I have hereunder signed my name in the presence of the two subscribed witnesses.

OSCAR E. VESTAL.

Witnesses:
PAUL SYNNESTVEDT,
F. E. GAITHER.